United States Patent
Lai

(10) Patent No.: US 8,553,412 B2
(45) Date of Patent: Oct. 8, 2013

(54) ELECTRONIC DEVICE

(75) Inventor: Yiu-Wai Lai, Taipei (TW)

(73) Assignee: Inventec Corporation, Taipei (TW)

( * ) Notice: Subject to any disclaimer, the term of this patent is extended or adjusted under 35 U.S.C. 154(b) by 277 days.

(21) Appl. No.: 13/157,136

(22) Filed: Jun. 9, 2011

(65) Prior Publication Data
US 2012/0243150 A1 Sep. 27, 2012

(30) Foreign Application Priority Data
Mar. 22, 2011 (TW) .............................. 100109745 A

(51) Int. Cl.
*G06F 1/16* (2006.01)
(52) U.S. Cl.
USPC ..................................................... 361/679.58
(58) Field of Classification Search
USPC .................................................... 361/679.58
See application file for complete search history.

(56) References Cited

U.S. PATENT DOCUMENTS

| | | | | |
|---|---|---|---|---|
| 6,256,194 B1 * | 7/2001 | Choi et al. | ............... | 361/679.58 |
| 6,517,129 B1 * | 2/2003 | Chien et al. | ................ | 292/251.5 |
| 6,535,380 B1 * | 3/2003 | Lee et al. | ................. | 361/679.27 |
| 6,678,154 B2 * | 1/2004 | DeLuga | ................... | 361/679.58 |
| 6,704,194 B2 * | 3/2004 | Koo | ......................... | 361/679.27 |
| 6,707,665 B2 * | 3/2004 | Hsu et al. | ................. | 361/679.58 |
| 6,762,928 B2 * | 7/2004 | Lo | ............................. | 361/679.58 |
| 7,715,184 B2 * | 5/2010 | Yang | ........................ | 361/679.37 |
| 7,885,064 B2 * | 2/2011 | Chen et al. | ............... | 361/679.58 |
| 8,040,671 B2 * | 10/2011 | Iwamoto et al. | .......... | 361/679.37 |
| 8,345,422 B2 * | 1/2013 | Chen et al. | ............... | 361/679.58 |

* cited by examiner

*Primary Examiner* — Lisa Lea Edmonds
(74) *Attorney, Agent, or Firm* — CKC & Partners Co., Ltd.

(57) ABSTRACT

An electronic device includes a case, a latch, and a detachable member. The case has a first surface and a second surface opposite to each other. The latch is movably configured on the first surface back and forth. The latch has a first pushing portion and a second pushing portion. The first and second pushing portions are located at two moving axes parallel to a moving direction of the latch. The detachable member is assembled to the case from the second surface, and a portion of the detachable member protrudes from the first surface and is locked to the latch. When the latch moves back and forth relatively to the case, the first and second pushing portions sequentially push the detachable member, so as to drive the detachable member to move relatively to the case and be disassembled from the case.

9 Claims, 5 Drawing Sheets

ELECTRONIC DEVICE

CROSS-REFERENCE TO RELATED APPLICATION

This application claims the priority benefit of Taiwan application serial no. 100109745, filed Mar. 22, 2011. The entirety of the above-mentioned patent application is hereby incorporated by reference herein and made a part of this specification.

BACKGROUND OF THE INVENTION

1. Field of the Invention

The invention relates to an electronic device. More particularly, the invention relates to an electronic device in which a detachable member can be disassembled in a stepwise manner.

2. Description of Related Art

A plurality of latch structures are often required to assemble a cover to or disassemble the cover from the back surface of an existing notebook computer. For instance, the latch structures of the notebook computer frequently include a locking module and a pushing module. The locking module locks the cover, and the pushing module pushes the cover out of the case. A user needs to assemble or disassemble the cover by simultaneously controlling the locking module and the pushing module with both hands.

SUMMARY OF THE INVENTION

The invention is directed to an electronic device in which a detachable member can be moved in a stepwise manner, so as to be disassembled from a case through a latch.

In an embodiment of the invention, an electronic device that includes a case, a latch, and a detachable member is provided. The case has a first surface and a second surface opposite to each other. The latch is movably configured on a first surface back and forth. The latch has a first pushing portion and a second pushing portion. The first and second pushing portions are respectively located at two moving axes which are parallel to a moving direction of the latch. The detachable member is assembled to the case from the second surface, and a portion of the detachable member protrudes from the first surface and is locked to the latch. When the latch moves back and forth relatively to the case, the first and second pushing portions sequentially push the detachable member to drive the detachable member to move relatively to the case and be disassembled from the case.

According to an embodiment of the invention, the first and second pushing portions push the detachable member along the same direction.

According to an embodiment of the invention, each of the first and second pushing portions pushes the detachable member along a direction which is perpendicular to the moving direction of the latch.

According to an embodiment of the invention, the detachable member has a first protrusion and a second protrusion which pass through the case from the second surface and protrude from the first surface. When the detachable member is locked to the latch, the first and second protrusions are located between the first pushing portion and the second pushing portion, and the first protrusion and the first pushing portion are located at a first moving axis.

According to an embodiment of the invention, the latch moves back and forth between a first position and a second position relatively to the case. When the latch moves toward the second position from the first position, the first pushing portion pushes the first protrusion along the first moving axis, so as to push the detachable member and move the second protrusion to a second moving axis where the second pushing portion is located. When the latch moves toward the first position from the second position, the second pushing portion pushes the second protrusion along the second moving axis to push the detachable member.

According to an embodiment of the invention, the latch includes a body and a locking hook. The body is movably configured on the first surface back and forth and has the first pushing portion. The locking hook extends toward the second protrusion from the body and has the second pushing portion. The body is locked to the second protrusion of the detachable member through the locking hook.

According to an embodiment of the invention, the latch moves toward the second position from the first position, and the locking hook releases the second protrusion before the first pushing portion comes into contact with the first protrusion.

According to an embodiment of the invention, the first pushing portion has a guiding inclined surface corresponding to a guiding inclined surface of the first protrusion, and the second pushing portion has a guiding inclined surface corresponding to a guiding inclined surface of the second protrusion, such that the latch moves back and forth to drive the detachable member to correspondingly move in same directions.

According to an embodiment of the invention, the electronic device further includes an elastic member that is configured on the first surface and connected between the latch and the case. The elastic member drives the latch to move toward the first position from the second position.

According to an embodiment of the invention, the electronic device further includes a pushing handle configured on the second surface. Besides, a portion of the pushing handle passes through the case and is connected to the latch.

Based on the above, the pushing portions of the latch in the electronic device are located at two moving axes according to the embodiments of the invention. Accordingly, when the user pushes the latch, the pushing portions of the latch are driven to sequentially push the detachable member of the electronic device. Thereby, the detachable member is disassembled from the case in a stepwise manner. Namely, the user is able to disassemble the detachable member from the case with ease.

Other features and advantages of the invention will be further understood from the further technological features disclosed by the embodiments of the invention wherein there are shown and described embodiments of this invention, simply by way of illustration of best modes to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
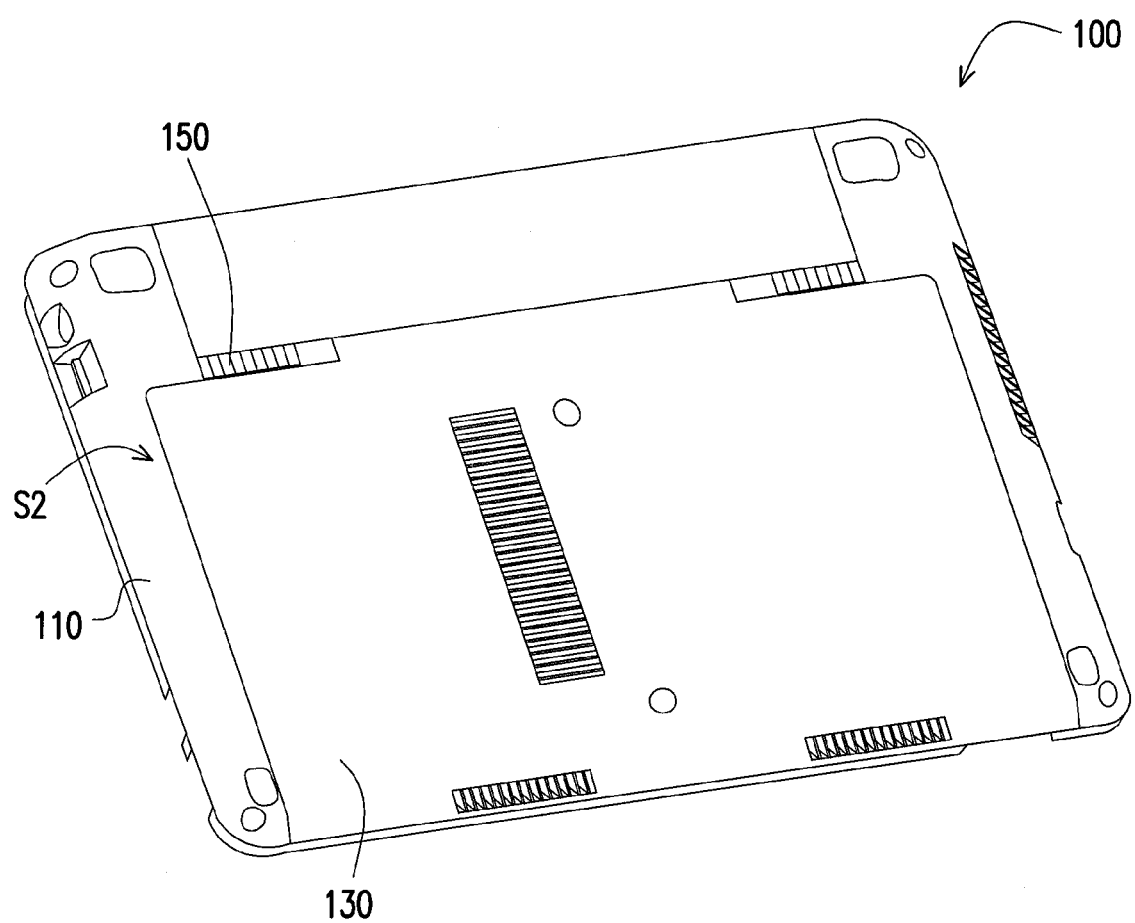
FIG. 1 is a schematic view illustrating an electronic device according to an embodiment of the invention.
Figure 2:
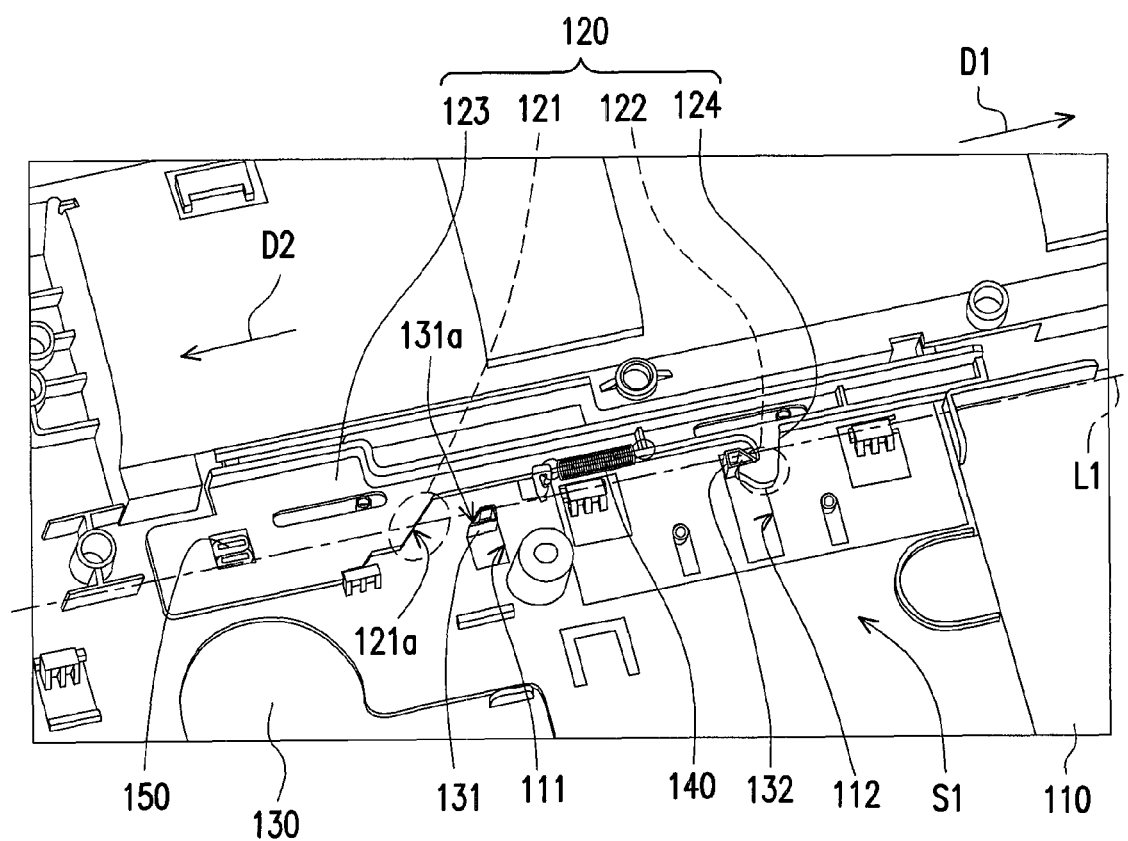
FIG. 2 is an enlarged view partially illustrating the electronic device depicted in FIG. 1 at an opposite view angle.

FIG. 1 is a schematic view illustrating an electronic device according to an embodiment of the invention. FIG. 2 is an enlarged view partially illustrating the electronic device depicted in FIG. 1 at an opposite view angle. With reference to FIG. 1 and FIG. 2, the electronic device 100 of this embodiment is a notebook computer, for instance. The electronic device 100 includes a case 110, a latch 120, a detachable member 130, an elastic member 140, and a pushing handle 150. To better illustrate the invention, not all of the components in the notebook computer are depicted. The case 110 has a first surface S1 and a second surface S2 opposite to each other. The latch 120 is movably configured on the first surface S1, and the latch 120 has a first pushing portion 121 and a second pushing portion 122. The detachable member 130 is a back cover configured on the second surface S2, for instance. In addition, the detachable member 130 is assembled to the case 110, so as to protect the electronic parts (not shown) in the case 110. In this embodiment, a portion of the detachable member 130 passes through the case 110 and protrudes from the first surface S1, and the portion of the detachable member 130 is locked to the latch 120, such that the detachable member 130 is fixed to the case 110. The elastic member 140 is configured on the first surface S1 and connected between the case 110 and the latch 120. The pushing handle 150 is configured on the second surface S2. A portion of the pushing handle 150 passes through the case 110, protrudes from the first surface S1, and is connected to the latch 120.

Accordingly, when a user intends to disassemble the detachable member 130 from the case 110, the user can exert a force on the pushing handle 150, so as to drive the latch 120 to move relatively to the case 110 along a first direction D1. When the user stops exerting the force on the pushing handle 150, the latch 120 moves back to the initial position along a second direction D2 due to an elastic force of the elastic member 140, such that the latch 120 can move back and forth on the case 110. Here, the second direction D2 is opposite to the first direction D1. Moreover, the first and second pushing portions 121 and 122 of the latch 120 are respectively located at two moving axes (e.g., the first and second moving axes L1 and L2 shown in the drawings) that are parallel to the moving directions D1 and D2 of the latch 120. Therefore, when the latch 120 moves back and forth relatively to the case 110, the first pushing portion 121 and the second pushing portion 122 sequentially push the portion of the detachable member 130 which protrudes from the first surface S1. Hence, the detachable member 130 is driven to move relatively to the case 110 in a stepwise manner, and the detachable member 130 is further disassembled from the case 110. The type of the detachable member 130 is not limited herein. Any structure that is configured on the electronic device 100 and equipped with a detachable member is applicable to this invention.

Figure 3:
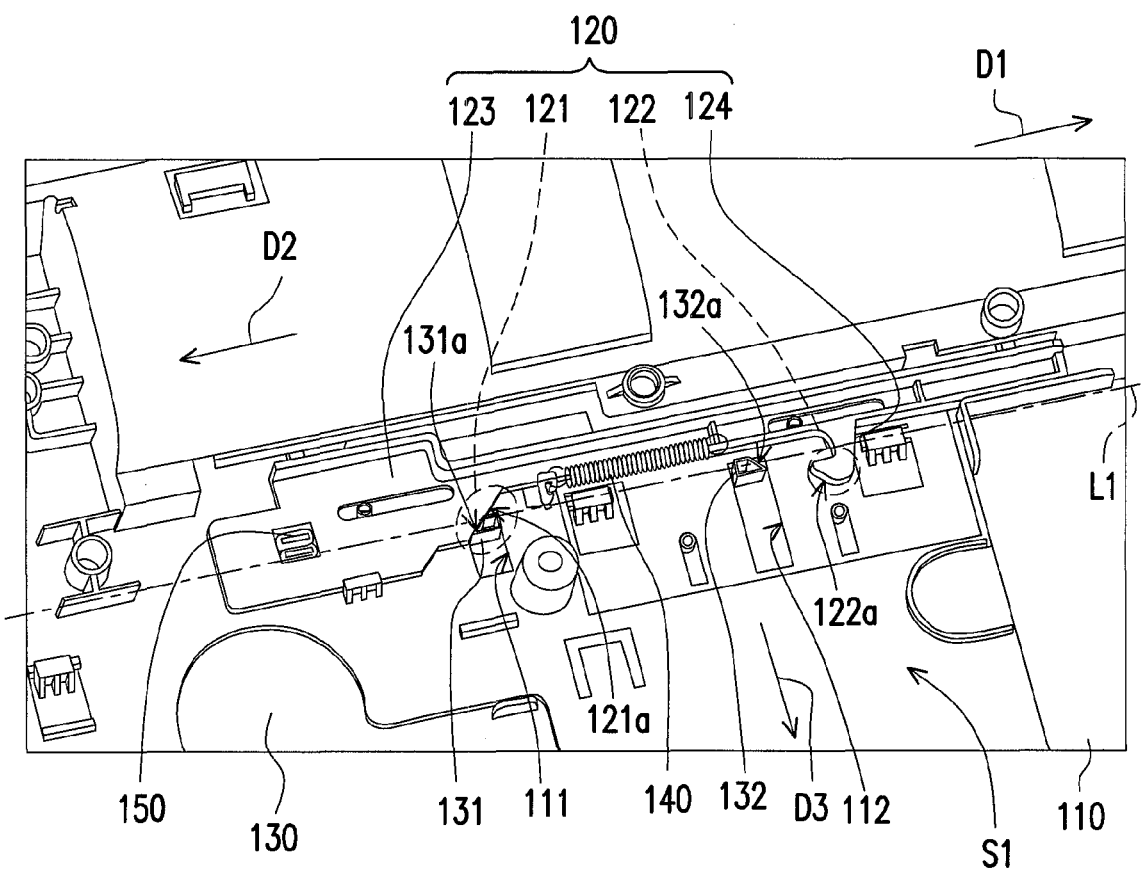
FIG. 3 to FIG. 5 are schematic views respectively illustrating that the electronic device depicted in FIG. 2 is in different states.
Figure 4:
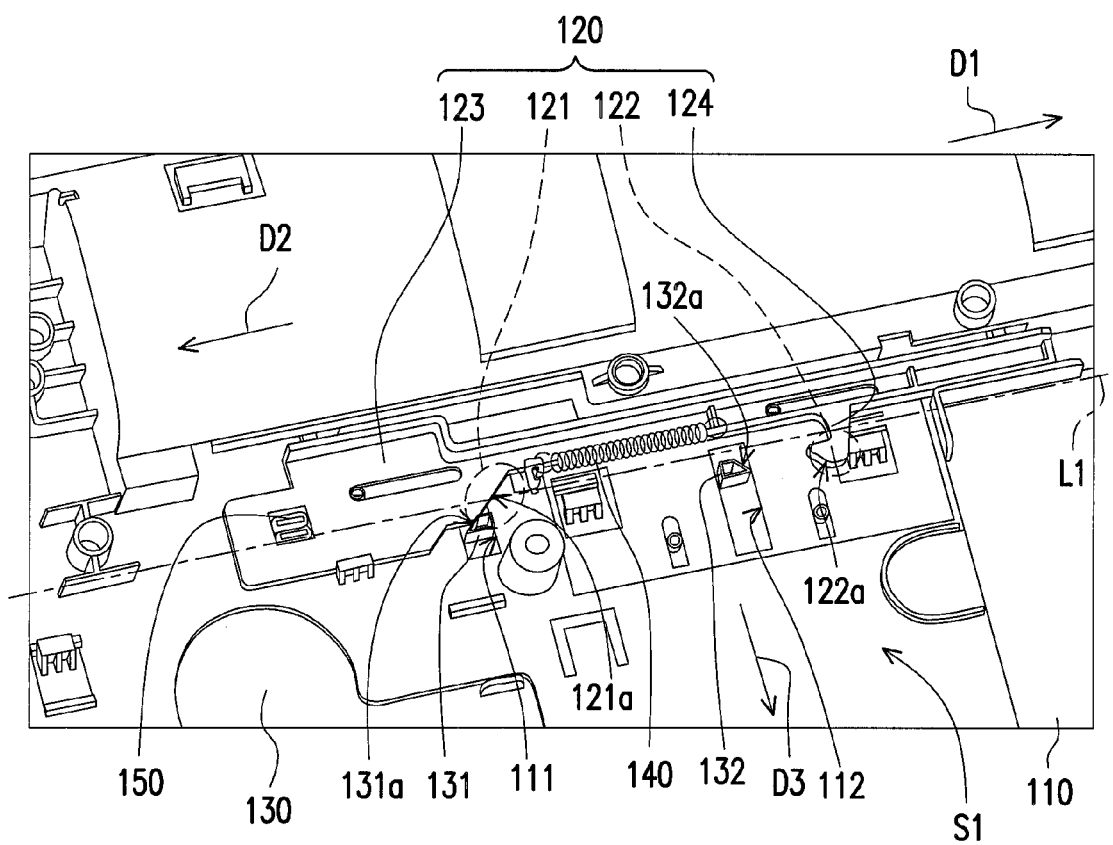
Figure 5:
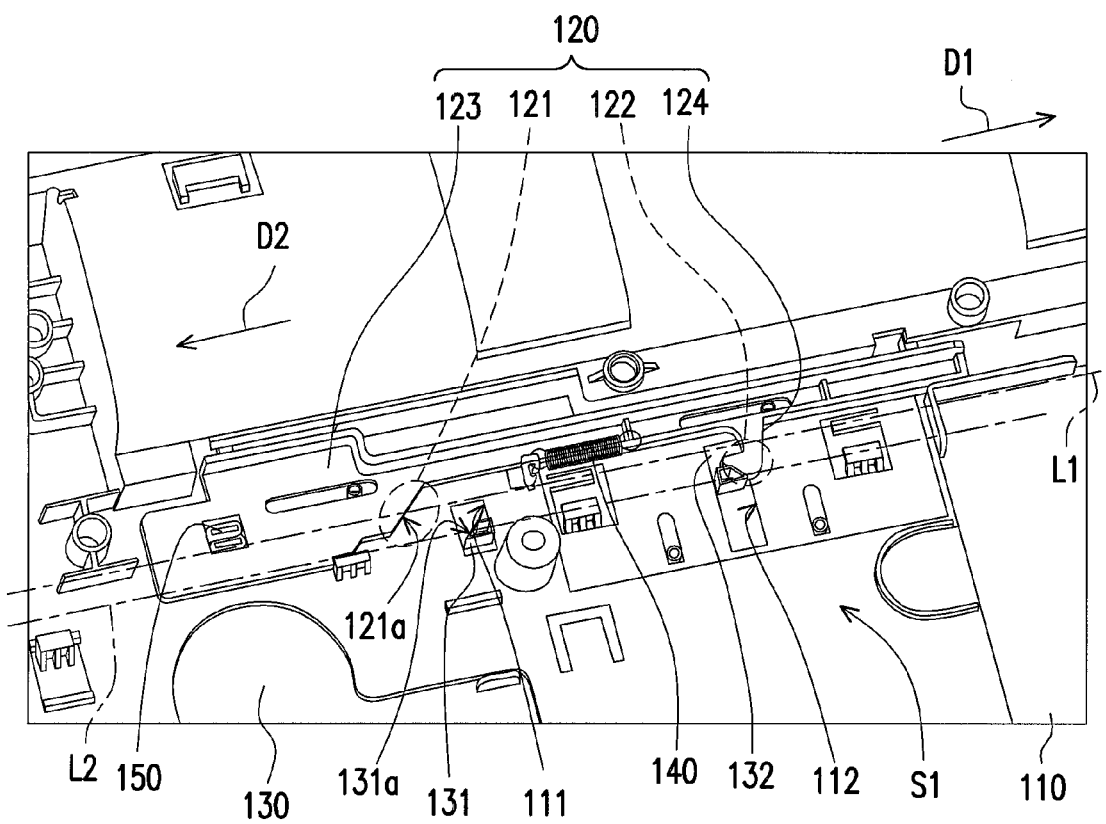

FIG. 3 to FIG. 5 are schematic views respectively illustrating that the electronic device depicted in FIG. 2 is in different states. Based on the illustration, the movement correlation between the latch 120 and the detachable member 130 relative to the case 110 is described. With reference to FIG. 2 to FIG. 5, specifically, the detachable member 130 has a first protrusion 131 and a second protrusion 132 that pass through the case 110 from the second surface S2 and protrude from the first surface S1. The first protrusion 131 and the second protrusion 132 are respectively coupled to a first rail 111 and a second rail 112 of the case 110. In addition, the latch 120 includes a body 123 and a locking hook 124. The body 123 is movably configured on the first surface S1 back and forth. The locking hook 124 extends toward the second protrusion 132 from the body 123. The first pushing portion 121 is located at one side of the body 123, and the second pushing portion 122 is located on the locking hook 124. When the detachable member 130 is assembled to the case 110 and locked to the latch 120, the first protrusion 131 and the second protrusion 132 are both located between the first pushing portion 121 and the second pushing portion 122, and the second protrusion 132 is locked to the locking hook 124.

In this embodiment, when the detachable member 130 and the latch 120 are locked, the first pushing portion 121 of the latch 120 and the first protrusion 131 of the detachable member 130 are both located at the first moving axis L1. That is to say, the first protrusion 131 is located at the moving path of the first pushing portion 121. When a user exerts a force on the pushing handle 150 to drive the body 123 of the latch 120 to move toward the first direction D1, i.e., toward a second position (shown in FIG. 4) from a first position (shown in FIG. 2), the locking hook 124 moves away from the second protrusion 132 to release the second protrusion 132. The first pushing portion 121 then pushes the first protrusion 131, such that the detachable member 130 moves toward a third direction D3.

Here, the first pushing portion 121 has a guiding inclined surface 121a corresponding to the moving direction D1 of the body 123, and the first protrusion 131 has a guiding inclined surface 131a corresponding to the first pushing portion 121. In other words, when the latch 120 moves along the first direction D1 to move the locking hook 124 away from the second protrusion 132, the two guiding inclined surfaces 121a and 131a come into contact with each other and push each other, so as to move the detachable member 130 toward the third direction D3. Here, the first protrusion 131 and the second protrusion 132 are respectively restrained by the first rail 111 and the second rail 121, and thus the moving direction (i.e., the third direction D3) of the detachable member 130 is perpendicular to the moving direction (i.e., the first direction D1) of the latch 120.

Note that when the first pushing portion 121 of the latch 120 pushes the first protrusion 131 to move the detachable member 130, the second protrusion 132 of the detachable member 130 is moved to the second moving axis L2 as well, as indicated in FIG. 5. Accordingly, the second protrusion 132 can be located at the moving path of the second pushing portion 122. When the latch 120 is affected by the elastic member 140 and then is moved toward the first position from the second position along the second direction D2, the second pushing portion 122 and the second protrusion 132 can push each other to move the detachable member 130. Similarly, the second pushing portion 122 has a guiding inclined surface 122a corresponding to the moving direction D2 of the body 123, and the second protrusion 132 has a guiding inclined surface 132a corresponding to the guiding inclined surface 122a. Through the two guiding inclined surfaces 122a and 132a, the second pushing portion 122 can push the detachable member 130 toward the third direction D3. After the detachable member 130 is pushed in a stepwise manner (i.e., in two steps), the detachable member 130 can be disassembled from the case 110.

In light of the foregoing, the pushing portions of the latch in the electronic device are located at two moving axes according to the embodiments of the invention. Accordingly, when the user pushes the latch, the latch is moved back and forth, such that the pushing portions are driven to sequentially push the detachable member of the electronic device toward the direction away from the case stage by stage. Thereby, the detachable member is moved away from the case and is disassembled from the case in a stepwise manner. Namely, the user is able to disassemble the detachable member from the case with ease.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims rather than by the above detailed descriptions.

What is claimed is:

1. An electronic device comprising:
    a case having a first surface and a second surface opposite to the first surface;
    a latch movably configured on the first surface back and forth, the latch having a first pushing portion and a second pushing portion, the first and second pushing portions being respectively located at two moving axes parallel to a moving direction of the latch; and
    a detachable member assembled to the case from the second surface, a portion of the detachable member protruding from the first surface and being locked to the latch, wherein when the latch moves back and forth relatively to the case, the first and second pushing portions sequentially push the detachable member, so as to drive the detachable member to move relatively to the case and be disassembled from the case, wherein the detachable member has a first protrusion and a second protrusion, the first and second protrusion pass through the case from the second surface and protrude from the first surface, and when the detachable member is locked to the latch, the first and second protrusion are located between the first pushing portion and the second pushing portion, and the first protrusion and the first pushing portion are located at a first moving axis.

2. The electronic device as recited in claim 1, wherein the first and second pushing portions push the detachable member along a same direction.

3. The electronic device as recited in claim 1, wherein each of the first and second pushing portions respectively pushes the detachable member along a direction perpendicular to the moving direction of the latch.

4. The electronic device as recited in claim 1, wherein the detachable member moves back and forth between a first position and a second position relatively to the case, when the latch moves toward the second position from the first position, the first pushing portion pushes the first protrusion along the first moving axis, so as to push the detachable member and move the second protrusion to a second moving axis where the second pushing portion is located, and when the latch moves toward the first position from the second position, the second pushing portion pushes the second protrusion along the second moving axis, so as to push the detachable member.

5. The electronic device as recited in claim 4, wherein the latch comprises:
    a body movably configured on the first surface back and forth and having the first pushing portion; and
    a locking hook extending toward the second protrusion from the body and having the second pushing portion, the body being locked to the second protrusion of the detachable member through the locking hook.

6. The electronic device as recited in claim 5, the locking hook releasing the second protrusion when the latch moves toward the second position from the first position and before the first pushing portion comes into contact with the first protrusion.

7. The electronic device as recited in claim 1, wherein the first pushing portion has a guiding inclined surface corresponding to a guiding inclined surface of the first protrusion, and the second pushing portion has a guiding inclined surface corresponding to a guiding inclined surface of the second protrusion, such that the latch moves back and forth to drive the detachable member to correspondingly move back and forth.

8. The electronic device as recited in claim 1, further comprising:
    an elastic member configured on the first surface and connected between the latch and the case, the elastic member driving the latch to move toward the first position from the second position.

9. The electronic device as recited in claim 1, further comprising:
    a pushing handle configured on the second surface, a portion of the pushing handle passing through the case and connecting the latch.

* * * * *